US006543866B2

(12) United States Patent
Chen et al.

(10) Patent No.: US 6,543,866 B2
(45) Date of Patent: Apr. 8, 2003

(54) POSITIONING STRUCTURE PIVOTALLY DISPOSED AT COMPUTER HOUSING

(75) Inventors: Feng Chuan Chen, Taipei (TW); Chao-Hsuan Yu, Taoyuan (TW)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/906,043

(22) Filed: Jul. 17, 2001

(65) Prior Publication Data

US 2003/0015947 A1 Jan. 23, 2003

(51) Int. Cl.[7] .............................................. A47B 81/00
(52) U.S. Cl. ...................... 312/223.2; 312/333; 292/218
(58) Field of Search .......................... 312/223.2, 223.1, 312/333, 215, 216, 222; 361/683, 684, 685, 686, 725, 726, 727; 292/56, 120, 218

(56) References Cited

U.S. PATENT DOCUMENTS

| | | | | |
|---|---|---|---|---|
| 3,863,762 A | * | 2/1975 | Arai | 292/218 |
| 4,052,093 A | * | 10/1977 | Fattori | 292/218 |
| 5,417,012 A | * | 5/1995 | Brightman et al. | 312/223.2 |
| 5,451,379 A | * | 9/1995 | Bowlin, Jr. | 292/218 |
| 5,673,175 A | * | 9/1997 | Carney et al. | 361/686 |
| 5,918,956 A | * | 7/1999 | Scholder | 312/223.2 |
| 6,293,636 B1 | * | 9/2001 | Le et al. | 312/223.2 |
| 6,299,266 B1 | * | 10/2001 | Justice et al. | 312/223.2 |
| 6,305,660 B1 | * | 10/2001 | Liao | 312/223.2 |

FOREIGN PATENT DOCUMENTS

| | | | | |
|---|---|---|---|---|
| EP | 450384 | * | 10/1991 | 361/683 |
| JP | 05189084 | * | 7/1993 | 361/683 |

* cited by examiner

Primary Examiner—Lanna Mai
Assistant Examiner—Hanh V. Tran
(74) Attorney, Agent, or Firm—Rosenberg, Klein & Lee

(57) ABSTRACT

A positioning structure pivotally disposed on a computer housing is provided. The positioning structure includes an assembly frame having first and second side walls, the first wall including a pivotal portion and a retaining portion. The first side wall further has a plurality of through holes being formed therethrough. The pivotal portion includes a pair of pivotal holes and a retaining portion projects from the first side wall and has a retaining hole formed therethrough. A positioning unit pivotally and releasably engages the pivotal holes of the pivotal portion. The positioning unit further includes a plurality of penetrating members which engage the through holes of the assembly frame and has a rotatable button being formed thereon. Rotation of the rotatable button allows for releasable locking of the positioning unit to the assembly frame.

2 Claims, 6 Drawing Sheets

POSITIONING STRUCTURE PIVOTALLY DISPOSED AT COMPUTER HOUSING

FIELD OF THE INVENTION

The present invention relates to a positioning structure pivotally disposed at a computer housing and, more particularly, to a positioning structure pivotally disposed at a computer housing and capable of fixing hardware parts of computer such as floppy disk drives, hard disk drives, or CD-ROM drives without the need of locking with screws.

BACKGROUND OF THE INVENTION

As shown in FIG. 1, when a CD-ROM drive 10a or another hardware part (not shown) such as a floppy disk drive or a hard disk drive is installed in a prior art computer, it needs to be placed on an assembly frame 11a of a computer housing 1a and then locked into lock holes 13a or lock grooves 14a using a plurality of screws 12a. The CD-ROM drive 10a or another hardware part (not shown) to be assembled can thus be positioned.

The above positioning way is very simple and will not cause trouble in manufacture for producers. However, for a maintenance man or a customer, if it is necessary to disassemble or replace the CD-ROM drive 10a or another hardware part (not shown), much inconvenience arises. Because both the actions of screwing and unscrewing the screws 12a are time-consuming, and it is easy to miss the screws 12a due to their small size, the assembly or disassembly will be very inconvenient.

Accordingly, the above computer has inconvenience and drawbacks in assembling and disassembling a CD-ROM drive or other hardware parts. The present invention aims to resolve the problems in the prior art.

SUMMARY OF THE INVENTION

The primary object of the present invention is to provide a positioning structure pivotally disposed at a computer housing. The positioning structure of the present invention is pivotally disposed on a sidewall of the computer housing, and can be turned over on the sidewall. Moreover, the positioning structure of the present invention has a plurality of penetrating parts through which hardware parts can be fixed to facilitate assembly or disassembly of hardware parts for a maintenance man.

To achieve the above object, the present invention provides a positioning structure pivotally disposed at a computer housing. The positioning structure of the present invention comprises an assembly frame and a positioning unit. A pivotal portion, a retaining portion, and a plurality of through holes are disposed at an outside of each of two sidewalls of the assembly frame. One end of the positioning unit forms a pivotal end, which is pivotally joined with the pivotal portion of the assembly frame. The other end of the positioning unit forms a positioning end. A plurality of penetrating parts are disposed at an inner side of the positioning end. The penetrating parts respectively correspond to the through holes of the assembly frame, and can fix hardware parts. Additionally, the positioning unit has a turn button thereon, which can make proper rotation on the positioning unit. The turn button can be retained with the retaining portion of the assembly frame. Assembly and disassembly of hardware parts can thus be easily and quickly accomplished.

The various objects and advantages of the present invention will be more readily understood from the following detailed description when read in conjunction with the appended drawing, in which:

DETAILED DESCRIPTION OF THE PREFERRED EMBODIMENTS

Figure 1:
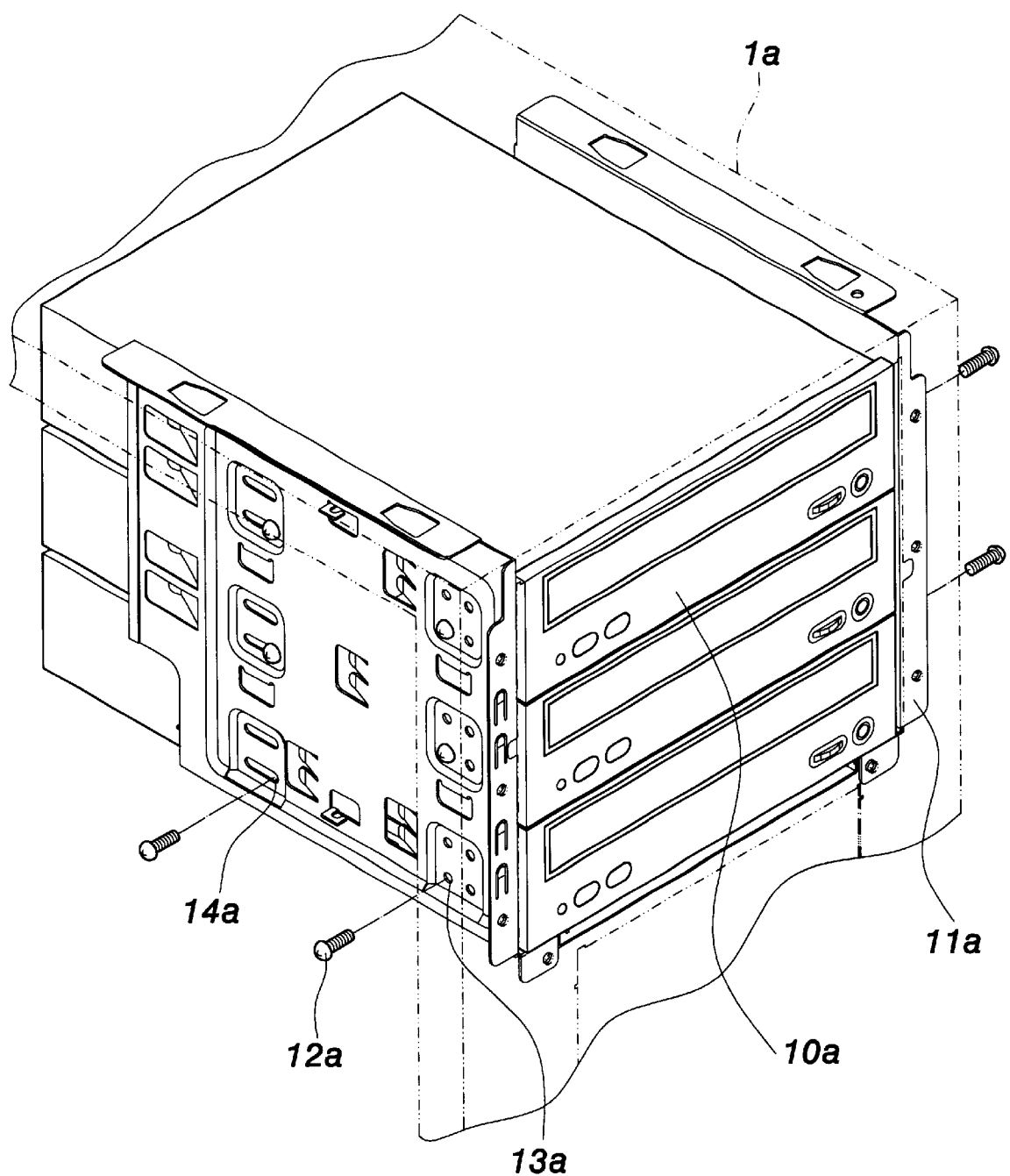
FIG. 1 is a diagram showing how a CD-ROM drive is installed in a prior art computer.
Figure 2:
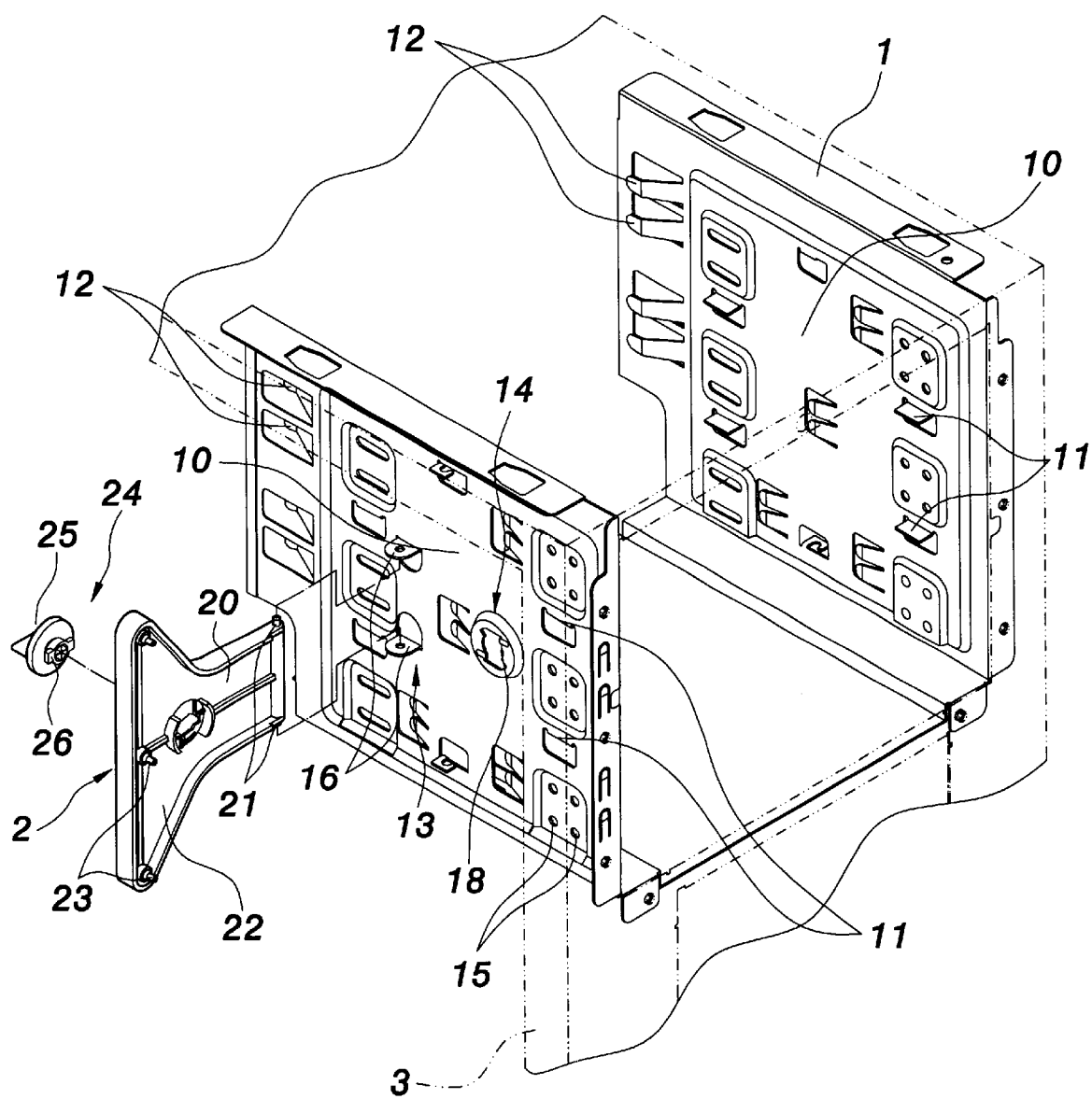
FIG. 2 is an exploded perspective view of the present invention.
Figure 3:
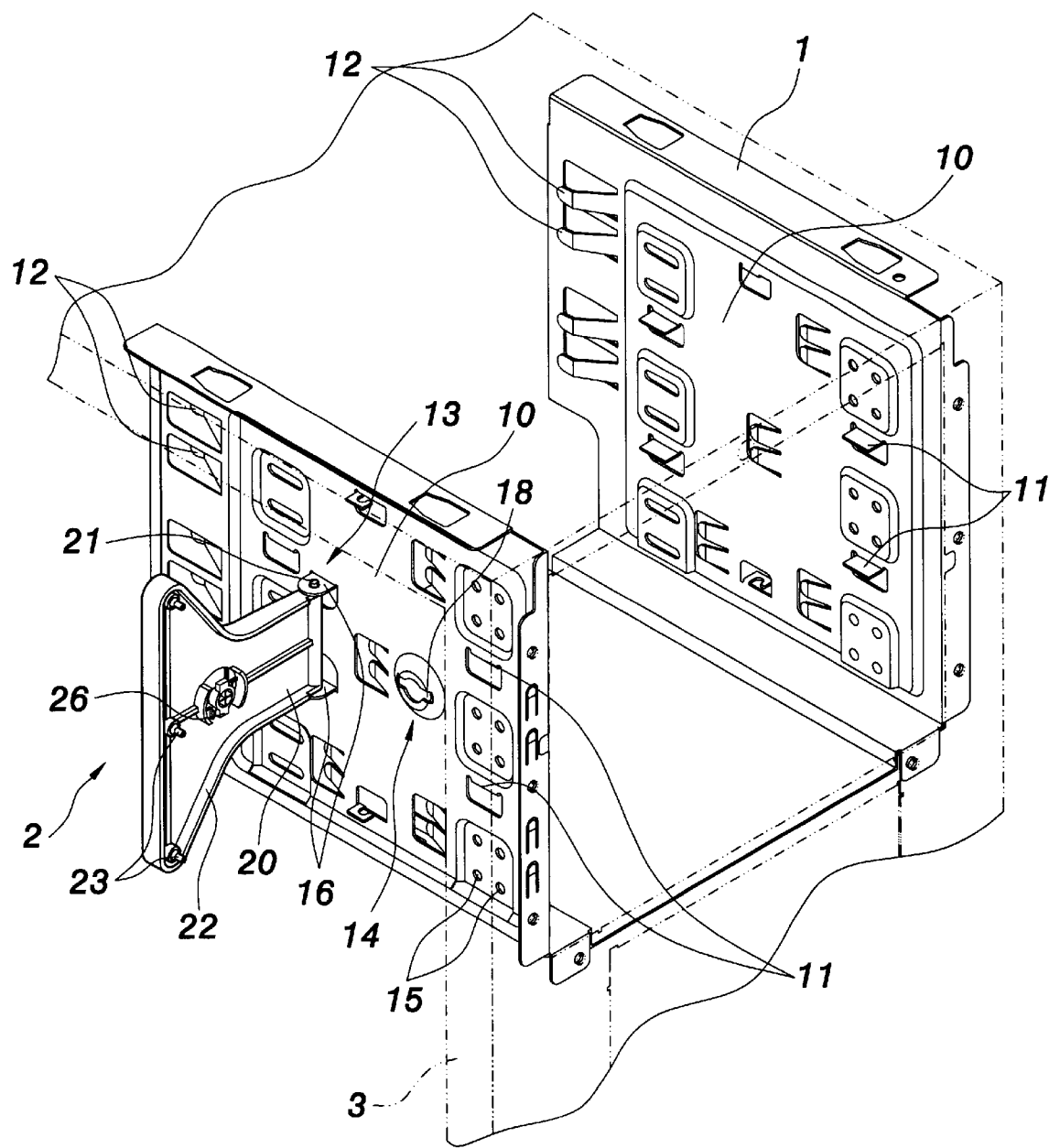
FIG. 3 is a perspective view of the present invention.
Figure 4:
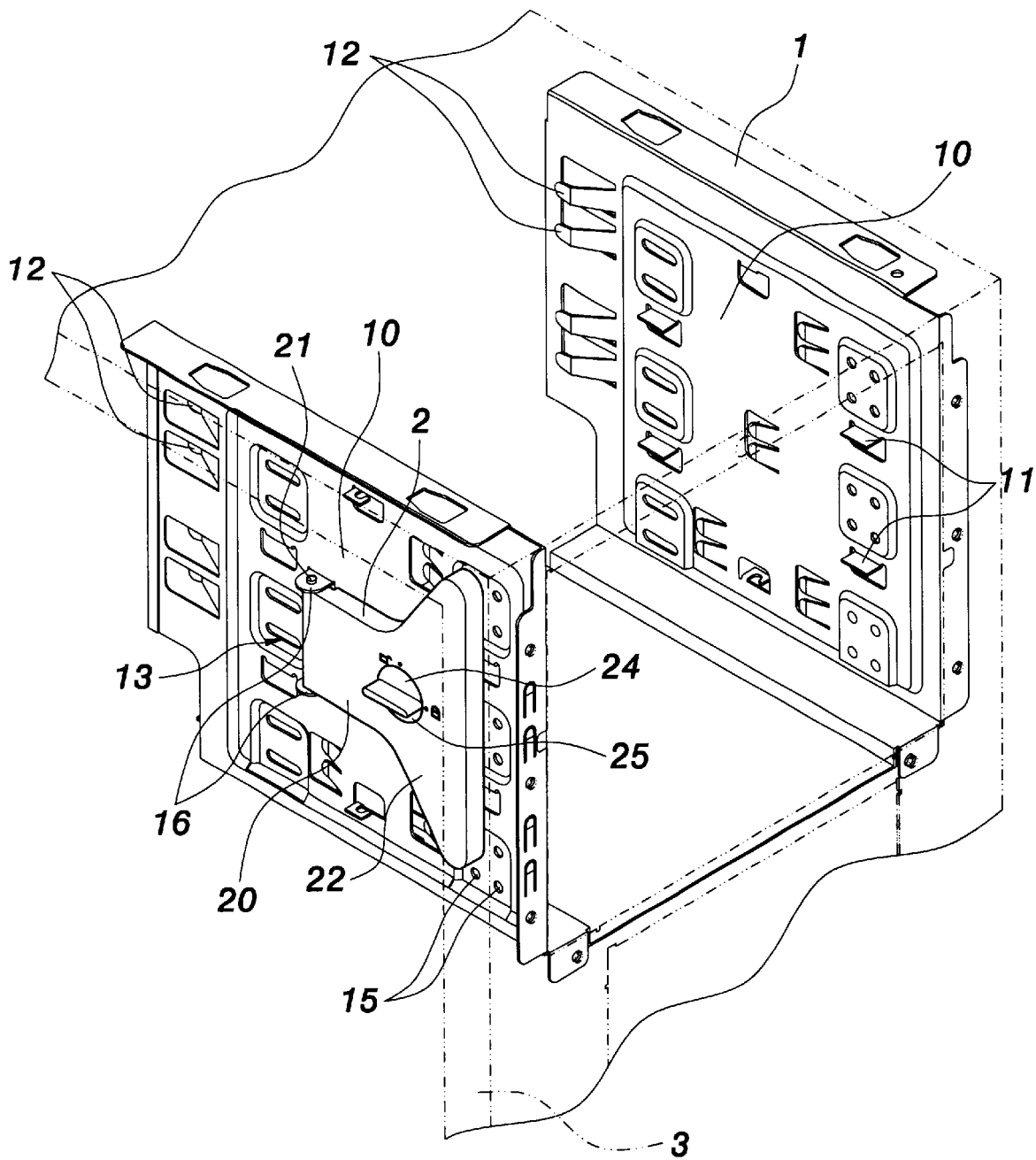
FIG. 4 is a perspective view of a use state of the present invention.
Figure 6:
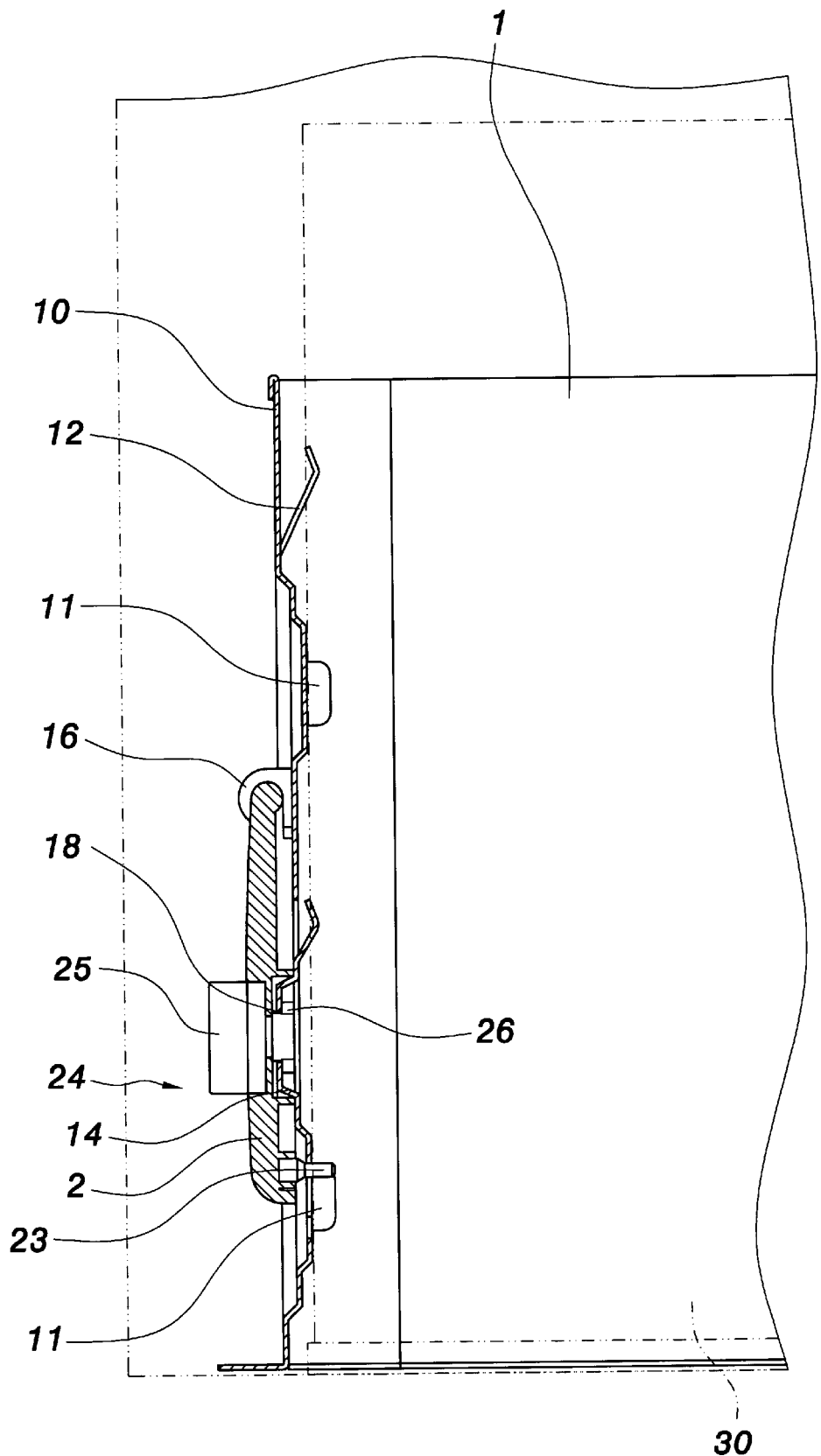
FIG. 6 is a cross-sectional view of a use state of the present invention.

As shown in FIGS. 2 and 3, the present invention provides a positioning structure pivotally disposed at a computer housing. The positioning structure of the present invention comprises an assembly frame 1 and a positioning unit 2. The assembly frame 1 is locked in a computer housing 3 and has two sidewalls 10. A plurality of inwards bent bearing portions 11 are disposed at inner sides of the two sidewalls 10. Different hardware parts 30 such as floppy disk drives, hard disk drives, or CD-ROM drives can be placed on the bearing portions 11, respectively, as shown in FIG. 6. A plurality of resilient sheets 12 are disposed at inner sides of the two sidewalls 10. The resilient sheets 12 can provide proper clamping force for the two sidewalls 10 to let the hardware parts 30 be more stably placed on the bearing portions 11 and not wobble thereabout, as shown in FIG. 6.

A pivotal portion 13, a retaining portion 14, and a plurality of through holes 15 are disposed at an outside of each of the two sidewalls 10 of the assembly frame 1. The pivotal portion 13 is composed of two opposite pivotal holes 16. The retaining portion 14 projects toward an outside of the sidewall 10 to form a groove 17 at an inside of the sidewall 10, as shown in FIG. 6. The retaining portion 14 has a retaining hole 18 thereon.

The positioning unit 2 is a sheet. One end of the positioning unit 2 forms a narrower pivotal end 20. Two opposite outer edges of the pivotal end 20 forms two pivots 21, respectively. The two pivots 21 respectively penetrate the two pivotal holes 16 of the pivotal portion 13 so that the positioning unit 2 can be turned over on the assembly frame 1 with the pivotal portion 13 as a fulcrum. The other end of the positioning unit 2 forms a wider positioning end 22. A plurality of raised penetrating parts 23 are disposed on an inside of the positioning end 22. The penetrating parts 23 respectively correspond to the through holes 15 of the assembly frame 1 and can exactly penetrate the through holes 15 to fix the hardware parts 30, as shown in FIG. 6.

Additionally, a turn button 24 is retained on the positioning unit 2. The turn button 24 can make proper rotation on the positioning unit 2. One side of the turn button 24 has a retaining part 26 matched with the retaining hole 18 of the retaining portion 14. The other side of the turn button 24 has a rotation portion 25.

Figure 5:
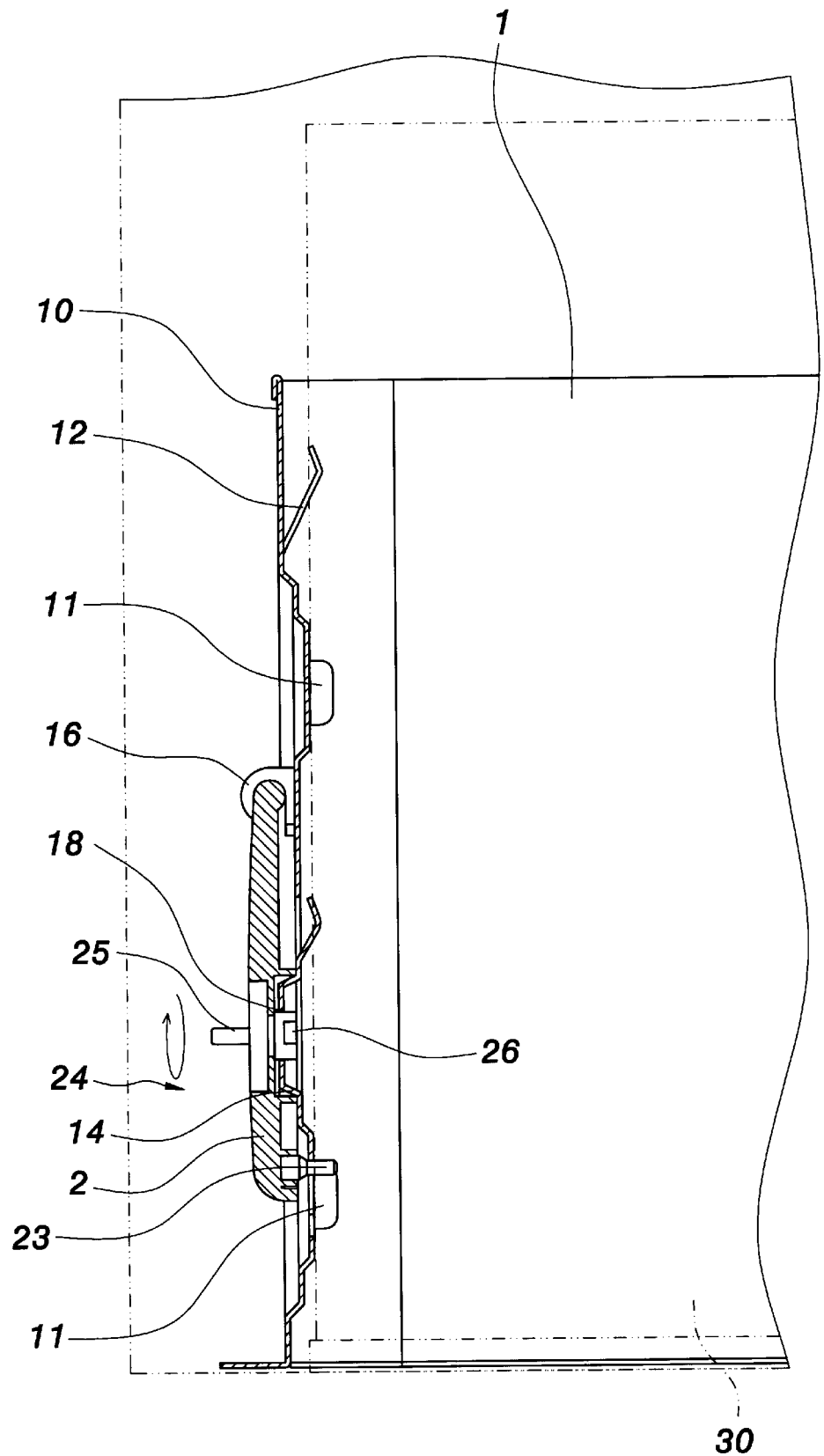
FIG. 5 is an action diagram of the present invention.

As shown in FIG. 5, the hardware parts 30 such as floppy disk drives, hard disk drives, or CD-ROM drives are first placed on the bearing portions 11. The positioning unit 2 is then turned over to let the penetrating parts 23 respectively penetrate the through holes 15 of the assembly frame 1 to fix the hardware parts 30. Next, the turn button 24 of the positioning unit 2 is screwed to retain the retaining part of the turn button 24 with the retaining hole 18 of the retaining portion 14, thereby achieving the object of fast assembling the hardware parts 30. Contrarily, when the hardware parts 30 are to be disassembled or replaced, it is only necessary to unscrew the turn button 24 to separate the retaining parts 26 from the retaining holes 18. The positioning unit 2 is then turned over outwards to let the penetrating parts 23 and the hardware parts 30 be separated, thereby easily and quickly accomplishing disassembly of the hardware parts 30.

To sum up, the positioning structure disposed at a computer housing of the present invention can fix the hardware parts 30 such as floppy disk drives, hard disk drives, or CD-ROM drives without the need of locking with screws. Much time of assembly and disassembly can thus be saved. Moreover, the problem of missing screws can be resolved. Therefore, the present invention can facilitate assembly or disassembly of the hardware parts 30 for a maintenance man.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A positioning structure pivotally disposed on a computer housing, comprising:

an assembly frame having first and second side walls, said first side wall having a pivotal portion and a retaining portion, a plurality of through holes being formed through said first side wall, said pivotal portion comprising a pair of pivotal holes being formed through a pivot region of said first side wall, said retaining portion projecting from an exterior surface of said first side wall, said retaining portion having a retaining hole formed therethrough; and, a positioning unit having first and second opposed ends, said first end of said positioning unit forming a pivotal end having a pair of opposed outer edges, each said outer edge of said pivotal end having a pivot rod projecting therefrom, said pivot rods respectively releasably engaging said pair of pivot holes of said pivotal portion, said second end of said positioning unit forming a positioning end, a plurality of penetrating members being disposed on said positioning end, said penetrating members respectively corresponding to and engaging said through holes of said assembly frame, said positioning unit having a rotatable button being mounted thereon, said rotatable button having a retaining member formed thereon, said retaining member engaging said retaining hole, whereby rotation of said rotatable button releasably locks said positioning unit to said assembly frame.

2. The positioning structure pivotally disposed on a computer housing as claimed in claim 1, wherein said rotatable button of said positioning unit has a rotatable gripping portion formed thereon.

* * * * *